US007537159B2

(12) United States Patent
Mugica et al.

(10) Patent No.: US 7,537,159 B2
(45) Date of Patent: May 26, 2009

(54) ELECTRONIC VOTING PAD INPUT DEVICE, SYSTEM AND METHOD

(75) Inventors: Antonio Mugica, Boca Raton, FL (US); Roger A Pinate, Boca Raton, FL (US); Roberto E Zamorano, Caracas (VE); Eduado M Correia, Caracas (VE); Edilmo D Palencia, Caracas (VE)

(73) Assignee: SmartMatic International Corporation (BB)

( * ) Notice: Subject to any disclaimer, the term of this patent is extended or adjusted under 35 U.S.C. 154(b) by 0 days.

(21) Appl. No.: 11/160,782

(22) Filed: Jul. 8, 2005

(65) Prior Publication Data

US 2007/0007340 A1 Jan. 11, 2007

(51) Int. Cl.
*G06K 17/00* (2006.01)

(52) U.S. Cl. .......................... 235/386; 235/51; 235/56; 705/12

(58) Field of Classification Search ................. 235/386, 235/51, 56, 54 A; 705/12
See application file for complete search history.

(56) References Cited

U.S. PATENT DOCUMENTS

| | | | | |
|---|---|---|---|---|
| 5,189,288 | A | 2/1993 | Anno | |
| 5,400,248 | A * | 3/1995 | Chisholm | 705/12 |
| 5,583,329 | A | 12/1996 | Davis, III | |
| 5,878,399 | A | 3/1999 | Peralto | |
| 6,540,138 | B2 | 4/2003 | Hall | |
| 6,688,517 | B1 * | 2/2004 | McClure et al. | 235/51 |
| 6,799,723 | B2 | 10/2004 | Kotob | |
| 6,892,935 | B2 * | 5/2005 | Weiss | 235/51 |
| 7,032,821 | B2 * | 4/2006 | McClure et al. | 235/386 |
| 7,048,186 | B1 * | 5/2006 | Chandler et al. | 235/386 |
| 7,111,782 | B2 * | 9/2006 | Homewood et al. | 235/386 |
| 2006/0102719 | A1 * | 5/2006 | Hsueh | 235/386 |

* cited by examiner

*Primary Examiner*—Ahshik Kim
(74) *Attorney, Agent, or Firm*—Furr Law Firm; Jeffrey Furr

(57) ABSTRACT

In the preferred embodiment, the invention is a data entry device intended for use by voters during an election to enter selected choices. Its basic functions are to display available options and accept voter input. Its design achieves simplicity in its preparation, deployment, and operation at any given electoral event. It also furnishes accuracy, reliability, durability, and reusability. It connects in a standard protocol to a voting station's host processor. It accepts up to 300 key codes, each one potentially a unique selection. Names, symbols, or pictures identifying candidates are printed on a paper template compliant with the device's geometry, inserted prior to an election, and visible through the device's transparent cover. When the number of candidates or valid options in a contest exceeds its capacity, additional identical units can be chain-connected, until a sufficient number of voting options are available.

20 Claims, 8 Drawing Sheets

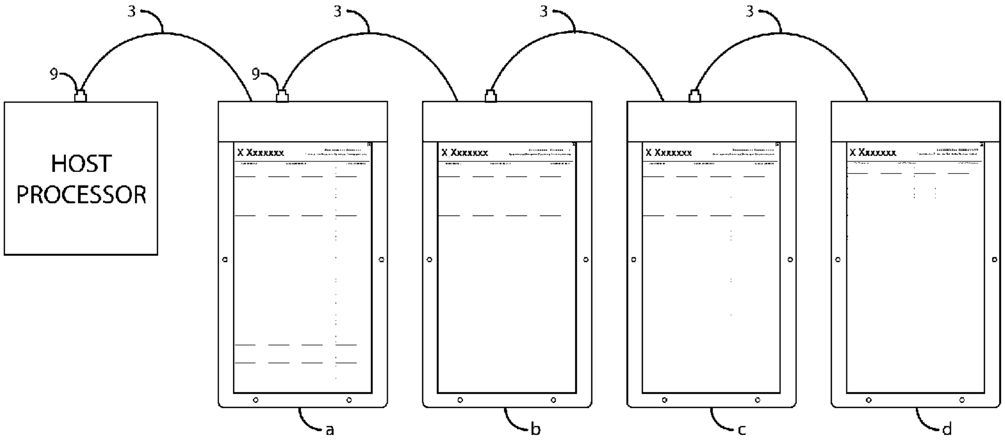
Fig. 8 - a
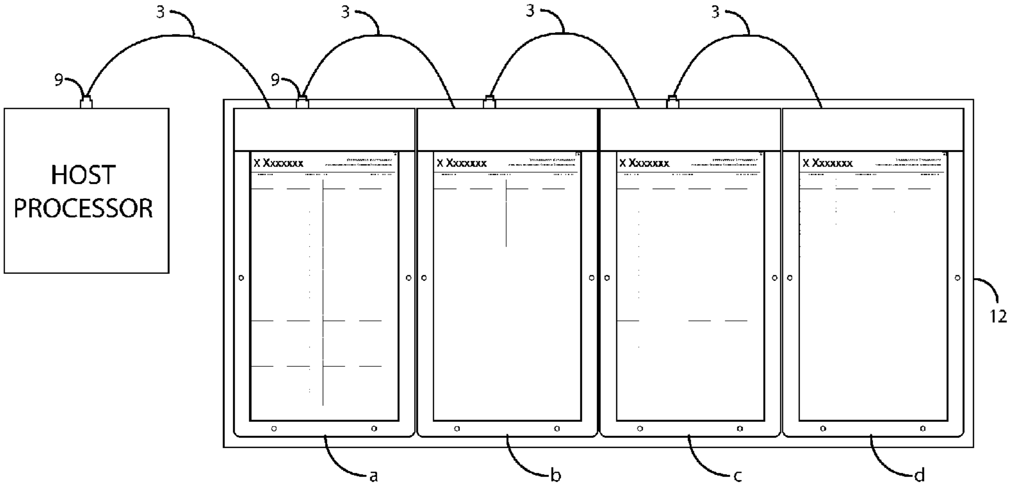
Fig. 8 - b

ELECTRONIC VOTING PAD INPUT DEVICE, SYSTEM AND METHOD

The present invention relates to a voting input means, system devices and methods.

BACKGROUND OF THE INVENTION

Some automated election systems currently in use at different worldwide locations have often been criticized or become the subject of controversy because of questions concerning their ability to provide an acceptable level of ease and convenience to the voting public, independently of other considerations concerning their reliability, security and auditability. Instead, occasionally some of said election systems have been hindered by frequent practical difficulties experienced by citizens during their actual voting act, said difficulties being related to the design of voting stations or data entry devices that do not offer a proper or convenient visual identification and easy manual selection of voting options available, or possibly due to confusion arising when voters are expected to perform operations that are more complex or cumbersome than anticipated, either manually or through mechanical or electronic means. Not infrequently, ballots have been designed and prepared with scant ergonomic provisions, possibly causing discomfort, nervousness and even frustration on the part of some voters who cannot easily find their preferred choices. At any rate, when difficulties have been experienced by a sufficiently significant proportion of the voting public at a given election, the consequences have been slowness in the voting process, and the occurrence of line delays, which in turn often have resulted in public dissatisfaction and even open protests.

Many of the traditional methods devised in the past have sometimes employed inadequate ballot designs, often in combination with machines or mechanical devices, requiring the voter to either actuate buttons, levers, or punching devices; or to write marks by hand on ballot sheets made of paper or other materials that must be subsequently scanned. Therefore, the process of voting has been hindered to a certain extent by a nontrivial potential for voter confusion, and also have been plagued by a potential for fraud. Many inventions in the past comprised unbelievably complicated designs, capable of frightening many an innocent voter, often unprepared to deal with impressive voting stations.

The interfaces that untrained voters must deal with for a first and single time cannot always be qualified as being user friendly, easy to understand, or straightforward to use, so interaction with such voting systems may pose a serious challenge to an average citizen, which must be solved in the course of a very short time as there is usually a time limit to cast a vote. It is a common experience to witness a voter undergoing a very stressing situation. Many a time, an election worker must step in and offer to help a voter accomplish his/her task, however not always such a gesture is welcome, as some voters may interpret it as an intrusion against their right to secrecy when actually voting. In other instances, the situation may be further complicated due to insufficient voter education, as instructions can be intricate or difficult due to the complexity involved, and hence confusing to voters. Sometimes when a voter meets the very instructions that are supposed to help or make easier the use of a voting station, the reaction is reluctance or even unwillingness to go through such complication.

Due to the above-mentioned physical and logical drawbacks related to some poorly designed mechanisms used to cast votes, which by themselves frequently may be a source of confusion or discomfort, there arises the problem of involuntary mistakes, whereby many a vote cast may not truly reflect the intentions of a voter; in other words, the voter was inadvertently led to an error which was not evident or could not be corrected prior to actual casting of the vote. In addition, there are frequent occurrences of invalid of incomplete votes where crucial options were omitted due to partial marking of a box or spot or due to incomplete pressing of button sequences. In all of these instances, the accuracy and integrity of the voting process is compromised.

In a given election, sufficiently numerous occurrences of annoying problems or errors may seriously affect the truthfulness, and hence distort the very results, of said election, giving rise to doubt, mistrust or dissatisfaction from the voting public, and can dangerously undermine confidence in a government and its institutions.

What a modern, efficient, secure and reliable computer-based electronic voting system needs in order to alleviate the above-mentioned drawbacks that may occur when actual votes are being cast, is a convenient, easy-to-understand and easy-to-use means of data entry suitable for use by the general voting public, incorporating modern, state-of-the-art devices such as special touch pads or touch screens, and whose programming has been designed for operation in combination with a sufficiently advanced electronic voting system.

Thus, the need has been identified for the availability of a convenient, effective, easy to explain, easy to understand, and easy to use data entry means for casting votes, having a sound, unequivocal design; laid out in a clear, logical geometric arrangement; that at each relevant step gives the voter instant feedback during the voting act; and allowing for unambiguous selection and verification of candidates or voting options. Such a data entry means would eliminate or at least minimize potential human error, promoting authenticity of the results; and would minimize the time spent by voters at the voting station(s), so that the overall satisfaction of the public would reach a higher level.

Further features aimed at enhancing functionality, accuracy and security, and also at assuring the voter's confidence in the voting system being used, include:

activation of the data entry device(s) upon a system command;

instant visual and audible feedback of data entry operations;

furnishing a way for visually checking each one of the options of the vote being cast, thus providing confirmation of the voter's choice(s);

providing a way to correct, change or delete choices made prior to actually casting a vote;

printing a paper slip upon casting of a vote, showing all its relevant information, as evidence that the voting system indeed has accepted his particular options as specified, and which the voter, after checking it, must deposit into a ballot box as a traceable record for the votes cast in a given location.

detecting any undue changes, substitutions, or alterations to the electoral configuration of the voting station's data entry devices, thus preventing any tampering attempts to same.

These are functions whose implementation is highly dependent upon the close relationship between the data entry device(s) and the electronic voting system employed, which necessarily must be designed to work together.

The voting data entry means of the present invention addresses such needs. It comprises either a single device or a plurality of state-of-the-art devices, that are made available to or are integrated into a voting station, such as a specially designed array of Electronic Pad units, or such as touch-screens of general or custom design, providing a voter interface having a clear display of voting information; furnishing an easy and intuitive mechanism for receiving voting selections made by each voter; and having sufficient built-in intelligence when supported by the accompanying electronic voting system, which may either be resident in a processor embedded within the voting station itself or may operate as an independent embodiment that is connected to the data entry device(s), in order to interact effectively with voters, administrative election officials and poll workers.

The input or data entry device(s), working together with the preferred electronic voting system, further comprises several ergonomic details aimed at enriching the voter's experience, providing visual and sonic aids as feedback and guidance during the voting session. The accompanying electronic voting system residing in the host, besides interacting with voters and other users by means of the data entry device(s) that are the object of the present invention, is in charge of opening and closing voting sessions; and is in charge of storing, representing, validating and displaying voting options corresponding to, and selected from, a database of one or more of a plurality of voting jurisdictions for the contests in effect. It is also in charge of recording and securely storing every one of the votes that are cast having all choices made by voters. Finally, it is in charge of a plurality of security, data integrity and audit procedures and provisions, in charge of printing a paper slip that enables voters to verify votes, in charge of printing the final voting tally for the individual voting station; and in charge of transmitting said votes and their tallies to the central computing facility for their inclusion in an election's overall computations.

DISCUSSION OF THE PREVIOUS ART

Among the issues related to the already well-known concept of automated voting systems and their electronic voting machines, there has been substantial controversy about both the advantages and drawbacks, and the merits and risks attributable to diverse mechanical, electromechanical, and electronic mechanisms, some of which have been around for quite a while, designed for the task of collecting votes during an election. A worthwhile automated election system is required to successfully address and solve the challenges and problems associated with crucial tasks encompassing all aspects of the collection and processing of votes from small to large populations, potentially servicing up to millions of voting citizens, across vast territories, including remote and dispersed areas. Such challenges include the preparation of the voting data deriving from the civil registry, from political parties supplying their candidates or lists running for different contests, and from electoral demography; also included are the administrative steps that must be performed to prepare, manage and deploy such voting data prior to distributing it across the many geographical entities (municipalities, counties and states) where voting machines or stations will be used in poll centers. In addition, automated voting systems are required to guarantee confidentiality, security, integrity, authenticity, and inviolability of the voting data collected. They must provide for multiple validation criteria, and allow for audit and verifications mechanisms, at various levels. Moreover, automated election systems are required to function rather quickly, allowing for easy, simple and fast steps to be performed by voters. Further, due to pressure to attain the outcome of an election at earliest possible time, the collected votes must be tallied and published in a very short time.

The actual physical means made available to voters, devised specifically to enable individuals to cast votes, include devices and apparatuses integrated to, attached to, or comprising voting stations designed for interacting with voters. As practically every other aspect in modern life that has been influenced or changed by computer technology, nowadays mechanical voting stations are by and large being replaced by electronic devices of wide-ranging designs. Modern voting stations are being used to accept and collect votes; convert input media to electronic means, store collected votes in electronic form, count such votes, and deliver or transmit electronic versions of votes cast or their abridged results to tallying centers. Interaction of such devices with voters is accomplished in several different ways. For example, some devices are still based on punchcard systems but have been adapted to read punched ballots or cards. Many other devices currently used in several voting system solutions utilize optical scanning technologies, namely Optical Mark Reading (OMR), also called Marksense systems, where citizens are required to vote for a candidate by filling in appropriate rectangles or circles in paper ballots, and subsequently feeding such paper ballots into an optical scanner integrated to, or connected to the Voting Station or polling device.

A recent significant development in the evolution of automated voting systems has been the advent of Direct Recording Electronic (DRE) systems. Such systems implement a data entry method offering apparent simplicity, employing an electronic input device that can be a touch-screen, keypad, push-button tablet, or a similar artifact, designed to allow voters to enter their choices and cast their votes directly. DRE voting machines can take diverse designs and forms that may vary in size and shape, from data entry devices integrated together with processor logic in enclosures that may resemble an Automatic Teller Machine, possibly including an accompanying booth, up to a common keyboard or touch screen connected to a standard laptop computer. DRE systems collect votes in electronic form as the result of direct interaction with voters; hence, there is no need for furnishing paper ballots or cards to individual voters, which is an obvious advantage in terms of economical and practical considerations. Collected votes are electronically stored on a connected (or embedded) processor's storage media for further processing.

However, in many DRE implementations found in the market, there is no clear apparent boundary between the data entry functions, that is, those where votes are collected, and the tallying or counting functions, where votes are subject to partial or local computations. Often these functions actually overlap along time as voting proceeds in any given election day in any given location. From a design viewpoint, and mostly as it concerns to an election's administrative and implementation tasks, it would be fairly advantageous to separate these two distinct functional areas, at least conceptually.

The inventions utilizing DRE technology mentioned in the following paragraphs, comprising a fairly adequate representation of the prior art, have in common seemingly unclear or incomplete explanations of the actual mechanics of the voting act, as the emphasis apparently is directed toward other aspects of the inventions. In some instances, a certain technology of the device type is mentioned, but often not furnishing enough detail thereof.

U.S. Pat. No. 5,583,329 to Davis, III, et al, discloses an electronic election system, which includes a voting terminal having an input device for receiving voter selection data, a first processor for processing voter selection data, a terminal memory for storing election data, and other included devices. However, except for FIG. 2 having a box named "Touch Screen", there is no mention whatsoever in the patent's disclosure about the nature and/or characteristics of the aforementioned "input device" which is part of the voting terminal.

U.S. Pat. No. 5,189,288 to Anno, et al, discloses a system and method for establishing a vote tabulation system, where a voter gains access to any one of a number of portable or hand-held terminals. However, in the patent's disclosure there is no mention of the characteristics of such hand-held terminals, or of the physical details of the actual interaction of a voter with said terminals.

U.S. Pat. No. 5,878,399 to Peralto discloses a voting machine, and, more particularly, to a method and apparatus for positive identification of voters. After several previous steps where a voter is identified by means of scanning fingerprints, signature, photograph, etc., when it comes to the actual mechanical action of voting, it is stated that "selections are made by making all selections and operating a button, lever or switch after all selections are made", omitting details about the mechanism involved.

U.S. Pat. No. 6,540,138 to Hall, et al, discloses a method for voting, wherein the voter's choices are transmitted via a wireless data acquisition device to a central computer. With such a method, a voter would enter the voting booth and make his or her selections on a simple handheld device. It is further stated that portable data entry devices that are suitable for recording votes are preferably portable terminals. Finally, it is stated that the voter, being in a private place, is given a wireless data acquisition device . . . where the voter makes the selections from the slate of candidates. However, said wireless data acquisition device, not being an integral part of the invention, is not described in any way, and neither are its operating details describing how a voter actually uses its functions and parts in order to actually make selections.

U.S. Pat. No. 6,799,723 to Kotob, et al, discloses an automated voting system, capable of providing multiple ballot styles in one or more voting units and providing a touch electronic keyboard for write-in candidates. However, throughout the rest of the disclosure statement and particularly in the detailed description of the invention, all interactions between the voter and the voting station are depicted as being carried out through the utilization of a touch screen, and the utilization of the above-mentioned touch electronic keyboard is never explained or further mentioned.

In spite of the various electronic ballot designs and data collection devices devised for voting applications known, as exemplified in the prior art, the need has been identified for a reliable, adaptable, flexible and economical data entry device which is able to receive keystrokes corresponding to available voting choices, capable of presenting choices visually in a similar fashion as customarily such choices used to be printed in paper ballots, without risking any possibility of fraud or tampering, and enabling easy interaction with the voter, as well as administrative workers. Such a device would do away with a problem experienced by many voters who are uncomfortable with using computers and their devices, due to a lack of understanding of how computers work, and this problem may manifest itself when using an electronic voting system with an appearance of being a complicated apparatus, difficult to understand and interact with.

Consequently, the present invention comprises a method and apparatus for facilitating the casting of votes in an election. The method applies to a Voting Device connected to or integrated into a host processor having a suitable voting system designed specifically to communicate and interpret character sequences and commands received from the voting module, as a result of keystrokes being performed by a voter. The apparatus or voting module (also known as "Voting Machine") employed will have a built-in touch sensitive display screen ("Touch Screen") and a Voting System software having a suitable GUI (Graphical User Interface) that allows for state-of-the-art interactivity, displaying menus, available options, "virtual button" commands, voting choices made, and confirmation or warning messages, enabling voters to easily cast their votes in election contests. The Voting Machine may work either as a single data entry unit using its built-in touch screen (used, for example, in simple polls where the voting options are either "yes" or "no", as in the case of state legislation proposals), or alternatively working together with an electronic touch pad setup (one or more Electronic Pad Device units chained together) designed specifically for the purpose of supplying an expanded data entry capability. Such Electronic Pad device constitutes the preferred embodiment of the present invention.

SUMMARY OF THE INVENTION

The object of the present invention is to provide a novel design for a data entry device, ideally suited for efficient interaction with voters, aimed at:

(a) allowing for easy verification that available voting choices for a particular poll event and geographical jurisdiction, as graphically displayed in the voting mechanism that will be visible to voters, indeed matches the corresponding information previously stored in electronic form in a specific voting machine or voting station appointed to a specific voting center or precinct;

(b) allowing for easy visual identification, through an orderly display or prearrangement, of voting choices available to a voter;

(c) allowing for simple data entry of selected voting choices using an electronic mechanism of unique design, being either a suitable touch-button device, or a touch screen device, or an electronic pad device having sufficiently large dimensions in order to accommodate a roster of electoral choices that may be as large as needed;

d) allowing for the hosting of a large assortment of voting choices, either through a suitable graphical user interface in the integrated touch screen working in combination with the touch-button device or the Electronic Pad Device, or through a device chaining mechanism whereby several Electronic Pad Device units may be serially connected in a chain, allowing a user to actuate virtually an unlimited number of different keystrokes, thus greatly expanding the availability of voting choices in any single voting station;

(e) allowing for easy, instantaneous, and stepwise verification of choices made by a voter as the voting act proceeds;

(f) allowing for either easy confirmation, or correction, of any previously selected choices, in case a voter realizes there is a mistake, or in case he/she is not satisfied with choices already made;

(g) allowing for a final overall verification of all choices currently selected up to the moment;

(h) allowing for a final confirmation whereby the vote is actually cast as is, and upon said confirmation said vote will be accepted by the voting machine or voting station;

(i) providing for thorough diagnostics that ensure the correct operation of the device and also confirms the exact correspondence between electoral options in the ballot as visually presented to a voter for a given electoral event in a particular precinct; and as a result maximizing the probability of a flawless, trouble-free and reliable operation during such election;

(j) providing for easy, hassle-free replacement of any unit that may prove defective or breaks down for ant given cause;

(k) allowing for significant savings due to avoidance of the need for printed ballots, at the rate of one per voter; instead just one printed-paper ballot is user per device.

(l) providing, by design, the capability of being reusable and re-configurable for deployment in several successive electoral events over a reasonable time span of several years.

BRIEF DESCRIPTION OF THE DRAWINGS OF THE PREFERRED EMBODIMENT

In order to supplement the description set forth below and to facilitate a better understanding of the features of the preferred embodiment of the present invention, the accompanying set of figures showing the most significant details of the Electronic Pad Device is included for informative and non-restrictive purposes.

FIG. 8-*a* shows an example of an arrangement comprised of four chained Electronic Pad Device units connected to a Voting Station's host processor.

FIG. 8-*b* shows a similar arrangement four chained Electronic Pad Device units, mounted in a frame that holds them together, which may be a convenient fashion for easy handling and storing of a set of several units.

Figure 9:
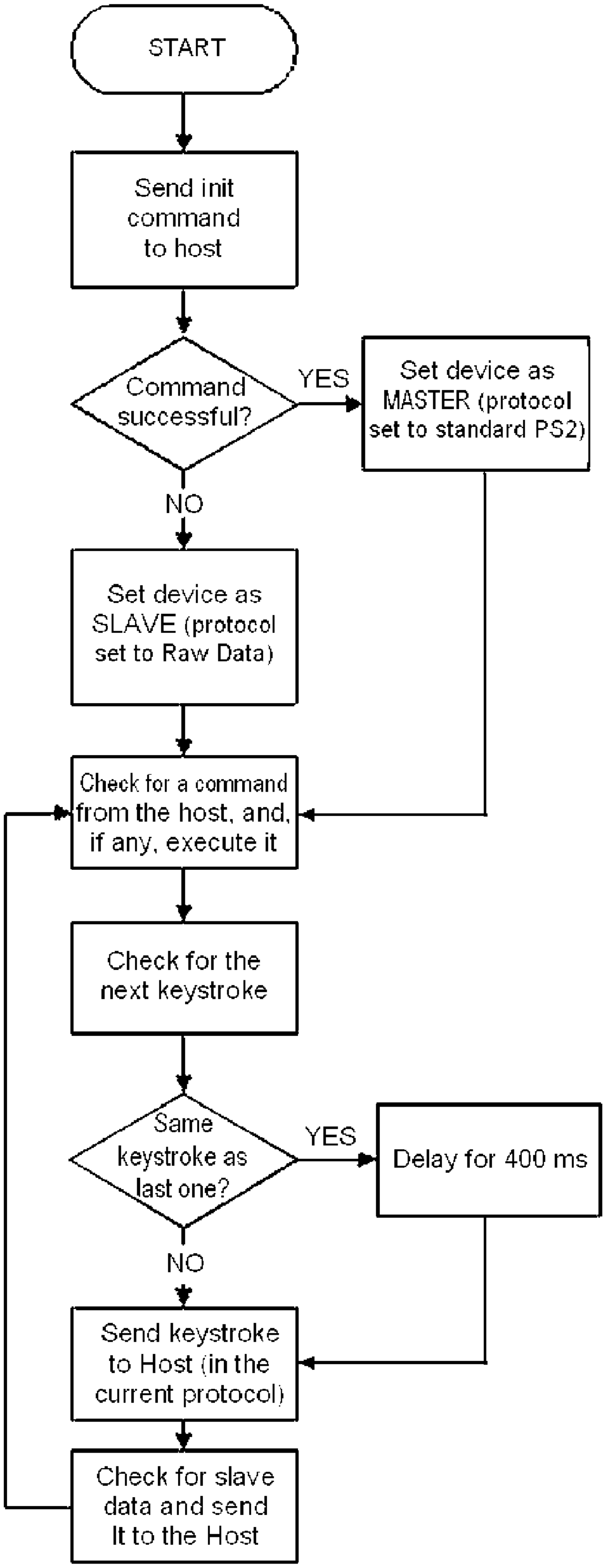

FIG. 9 depicts a program logic diagram of the Controller Circuit's firmware of the Electronic Pad Device.

DETAILED DESCRIPTION OF THE PREFERRED EMBODIMENT

In light of the aforementioned Figures, a preferred embodiment of the invention is described below along with an explanation of the drawings.

The invention consists of an Electronic Pad Device which is essentially a human input device, having in principle a 300-key matrix (4×75) of the membrane contact keyswitch type; using either Serial, USB, or PS2 hardware and protocols for communication with the host; incorporating several functions aimed at providing the basis for implementing a number of software security and reliability measures; whose specific and only purpose is to serve as a voting device—so it could rightfully be called "Electronic Voting Pad", "Electronic Ballot", "Keypad Ballot", or other similar names—, and designed to attain the goals of reliability, accuracy, simplicity and low cost, among others. In this document it will henceforth be called "Electronic Pad Device". The above-mentioned number of available contact points (300) is a good compromise between convenient dimensions and weight factors and sufficiently ample voting choices to be presented which can be active at a given event in a single unit; nonetheless, several other matrix size combinations, and hence, device dimensions, are feasible. Similarly, the membrane technology is currently favored due to its simplicity, durability, and low cost; however other touch-sensitive technologies are equally feasible.

The Electronic Pad Device is a lightweight, flat device of size and shape reminiscent of a flatbed scanner. The device of the present invention includes a housing having a base, a lid with a protective transparent cover, a back panel, two membranes, and a spacer layer. A controller circuit, installed within the housing, performs several functions such as keystroke detection, scan codes submittal, execution of host-received commands, collision detection, and command retry. Said controller circuit does not store any information whatsoever about the contents of the vote of any particular elector. Its functions are summarized below, under "Principles of Operation and Functional Characteristics of the Preferred Embodiment".

The design of the touch-sensitive components consists of three layers. The top layer or membrane has conductive strips running on its underside. Under this it has a spacer layer, which keeps the top and bottom layers apart so that they do not make electrical contact, unless a pressure is applied over any one of the contact points or areas. The bottom layer or membrane has conductive strips perpendicular to those of the top layer. The top and bottom layer circuits are connected to a controller circuit that lies close to the hinge holding the upper lid to the base.

When assembled in a factory, the combined strips in the top and bottom layers outline a grid. When pressure is applied at a particular position in the grid, the top layer is pushed down through the spacer layer to close a circuit with the bottom layer at one of the intersections of the grid. The controller circuit is programmed to sense that a particular keystroke or "button" is being pressed, out of the three hundred possible combinations in the unit, and sends a corresponding scan code sequence to the host processor. The membrane mechanism does not provide by itself a "feel" that contact has been made, as there is insignificant mechanical motion. Hence any other kind of feedback to the user must be provided by electronic means and/or under program control.

The device is equipped with a PS2 cable and connector, connecting it to a BIOS-compatible host's standard PS2 communications port, in order to establish bi-directional communication enabling it to send scan codes to the host processor and receive commands from same. There is no need for a power supply, as the minimal power requirements of the unit are supplied by the PS2 port. Instead of the PS2 ports, connectors and protocol, the device could alternatively be built using equivalent USB or Serial hardware and protocols.

The lid has a transparent layer that is actually the pressure contact surface, so the upper membrane is never touched by human fingers or by any other objects. In actual operation, the lid is closed and secured by means of special screws; the unit is sealed by adding security stickers or decals, which cannot be removed without destroying them. If an attempt to open the unit is made by an unauthorized person, it will be evident that tampering has occurred, so the overall result is a fairly rugged and tamper-resistant design.

Figure 1:
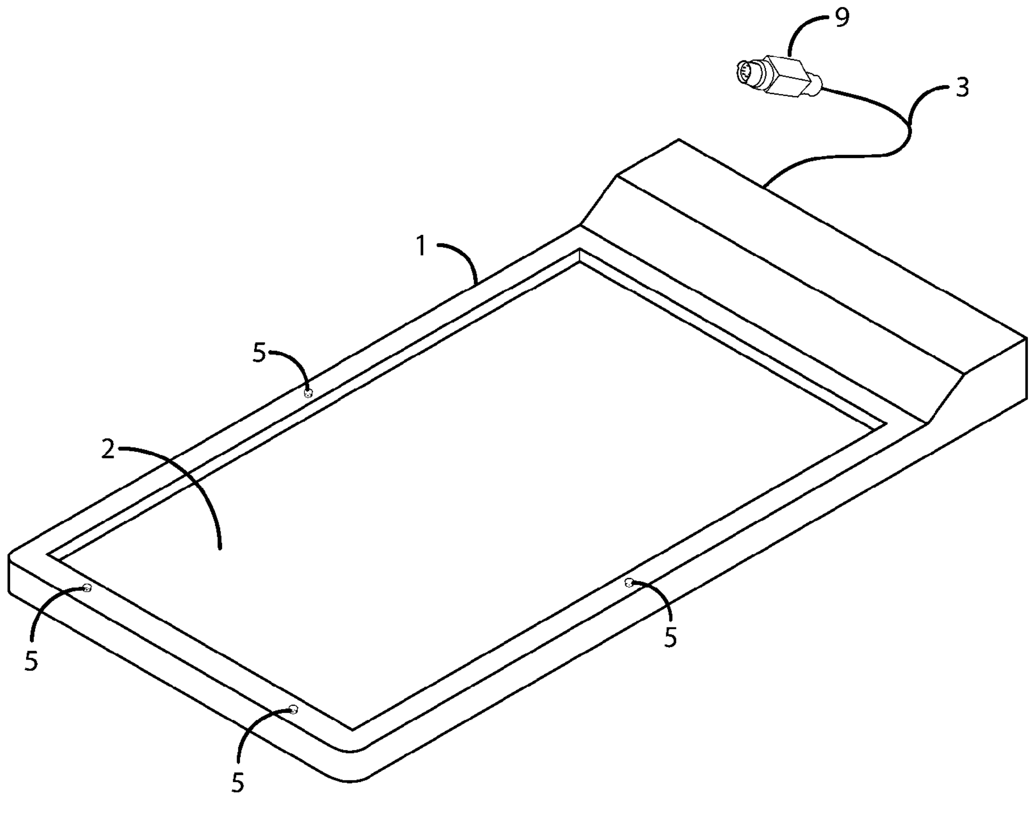
FIG. 1 shows a schematic perspective view of the Electronic Pad Device that is the preferred embodiment of the present invention.

FIG. 1 shows a perspective schematic view of the Electronic Pad Device with its lid 1 closed, showing its cable 3 and connector 9. Screw holes 5 house special screws (for example, Allen or Torx screws) that secure the contents of the device by preventing the lid from being opened by unauthorized persons. Screws may be further protected by attaching tamper-proof seals or decals, covering such screw holes. Voters may clearly see the printed ballot template through the transparent protective layer 2.

Figure 2:
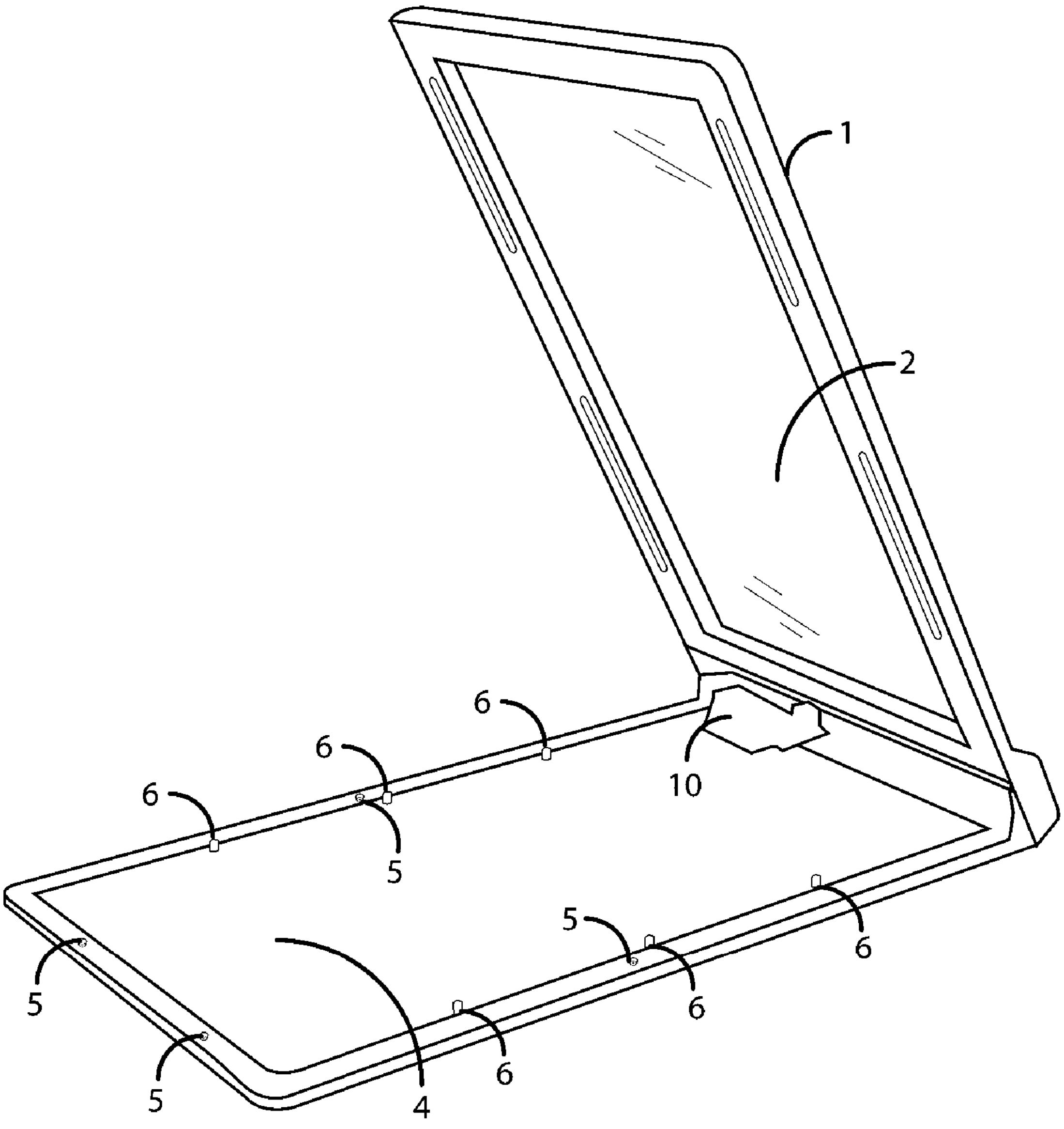
FIG. 2 shows a schematic perspective view of the Electronic Pad Device with its lid open.

FIG. 2 shows another perspective schematic view of the Electronic Pad Device with its lid 1 open. Screw holes 5 are shown, along with guides 6 molded as part of the unit base. The upper membrane's circuitry 4 is connected to the Controller Circuit 7.

Figure 3:
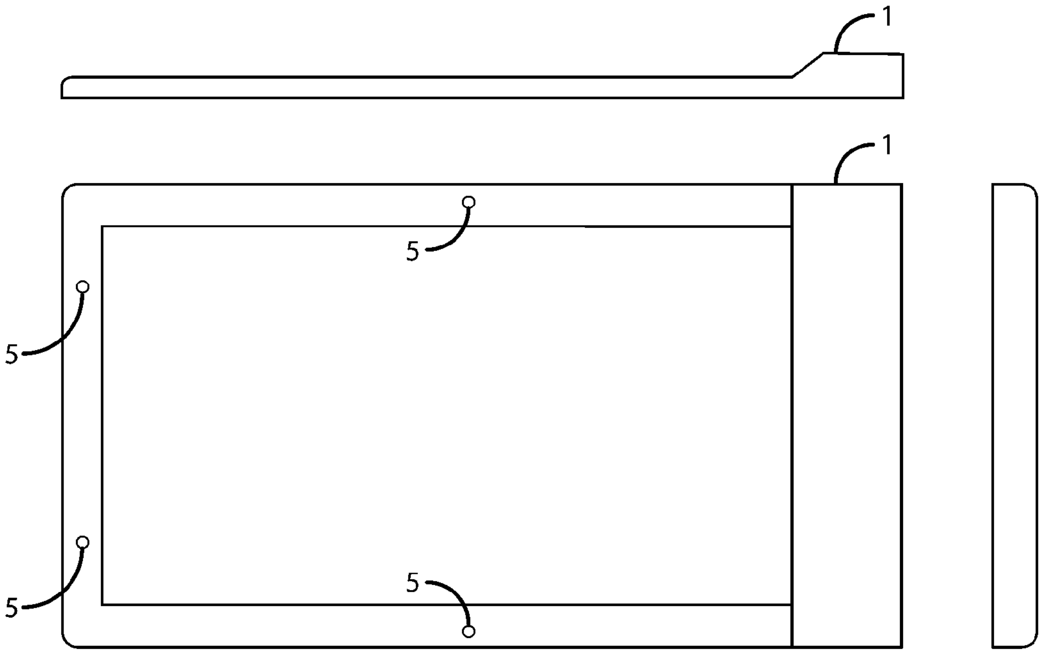
FIG. 3 depicts side, top and back schematic views of the Electronic Voting Pad's lid or cover.

FIG. 3 depicts side, top and back views of the Electronic Voting Pad's lid or cover 1. The bulge at right (side view) houses the Controller Circuit and the hinge joint uniting the lid to the device base.

Figure 4:
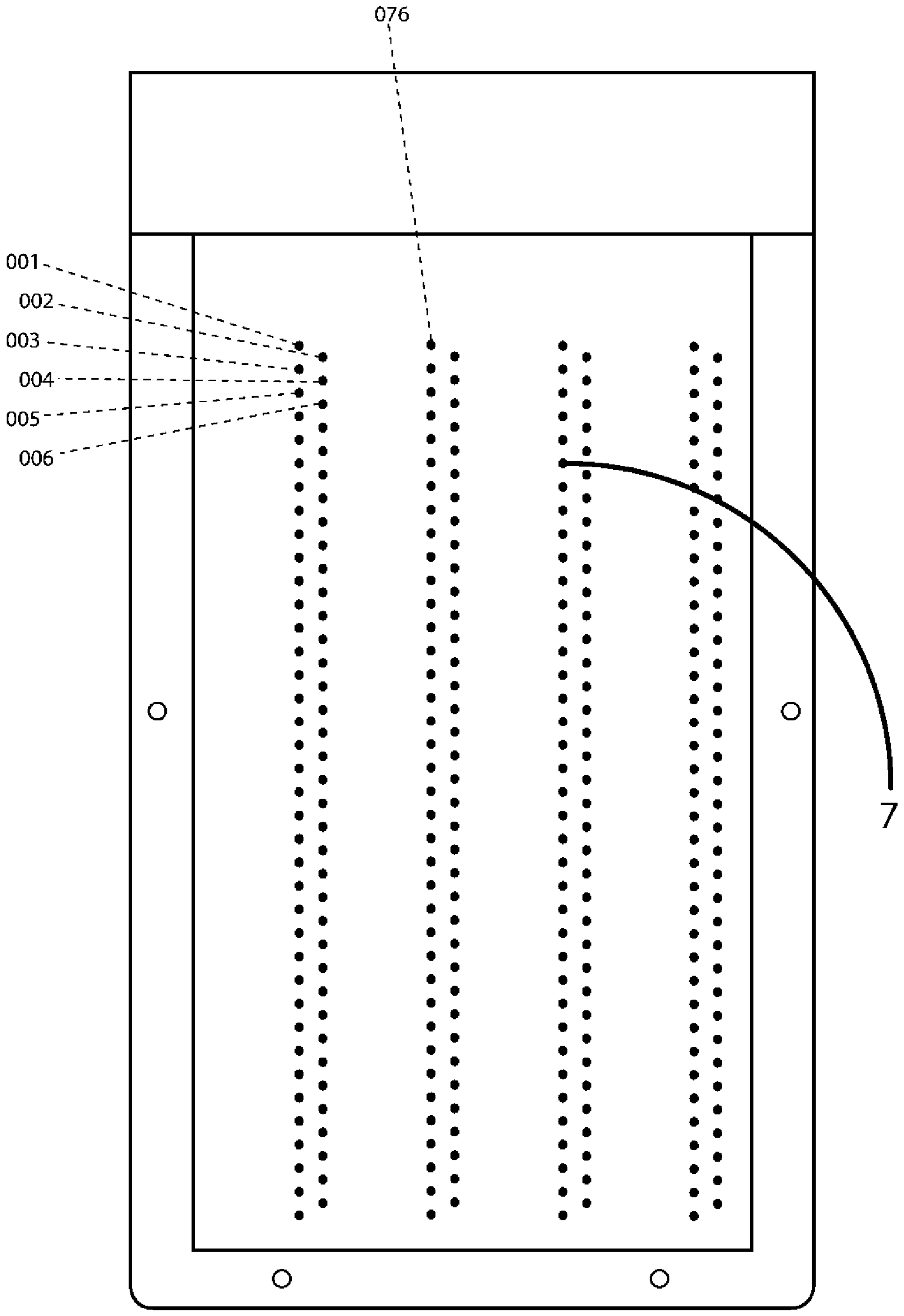
FIG. 4 shows a top view of the Electronic Pad Device with its lid removed, showing the upper membrane and its touch key numbering scheme.

FIG. 4 shows the Electronic Pad Device with its lid removed, showing the upper membrane 4 which uses a three-digit numbering for its array of "buttons" or key positions, starting with 001 at the uppermost position of the leftmost column (which runs from 001 through 075), continuing with 076 at the uppermost position of the second column (which runs from 076 through 150), and so forth.

Figure 5:
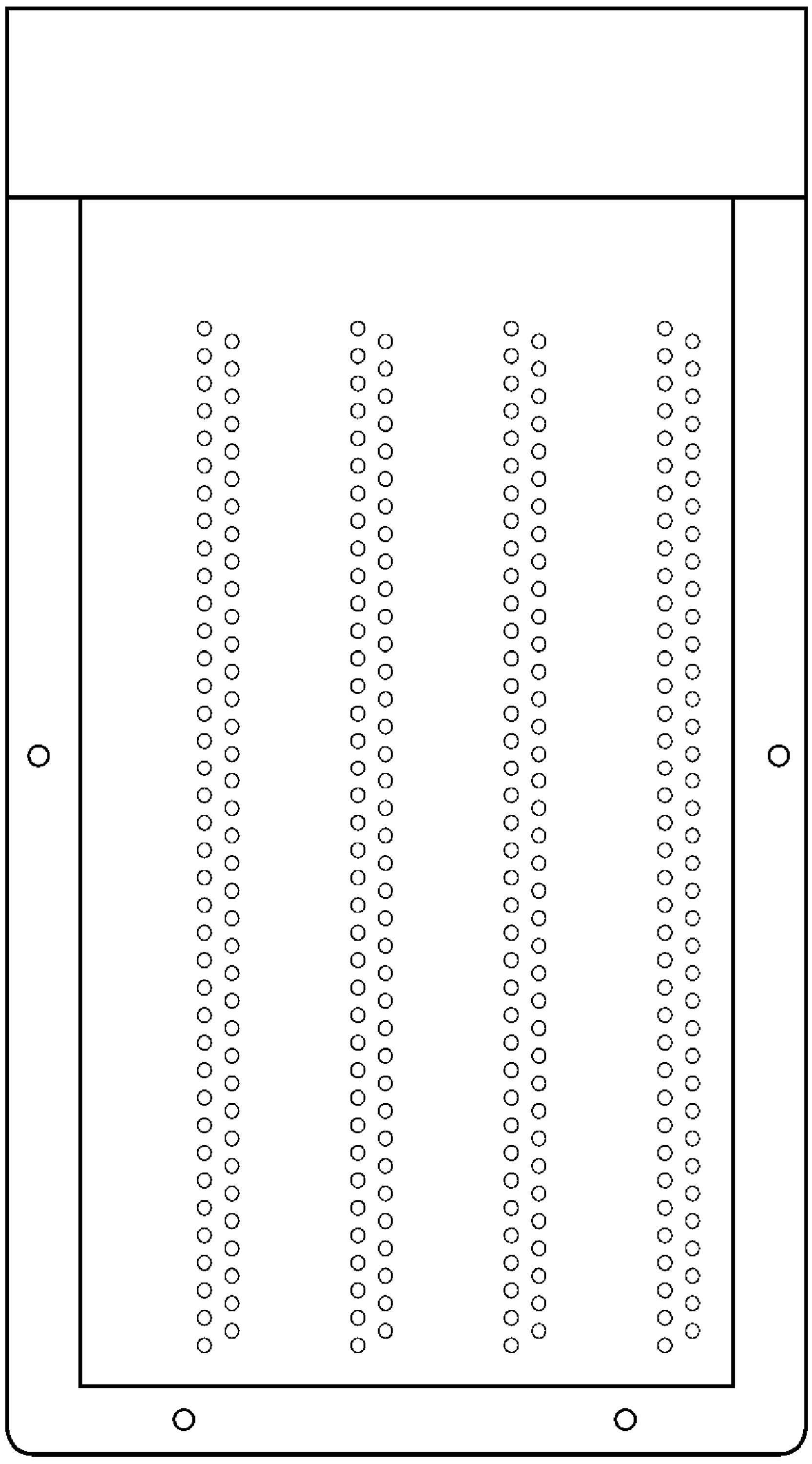
FIG. 5 shows a schematic top view of the spacer layer, further emphasizing the locations of pressure points corresponding to touch-sensitive areas or "buttons".

FIG. 5 shows a schematic top view of the spacer layer 7, also showing the locations of the touch-sensitive areas or "buttons" arranged in four columns, where pressure may be applied with a finger in order to make electoral choices, which in turn are visible in the paper ballot template (see below) placed on top of the upper membrane 4 immediately above the spacer layer.

What makes the Electronic Pad Device a versatile electoral data entry means is the ability to accept a single sheet of paper having the names, logos, pictures, photographs, and any suitable printed information identifying each one of the choices that will be active for a given device in a given election. Such sheet is the equivalent of the widespread traditional paper ballot, that has since long been used to cast votes by means of hand marking or machine punching such ballots in the appropriate places, but with an important difference, which is the fact that a single pre-printed paper ballot "template" is inserted in the Electronic Pad Device just once, as one of the operations carried out in a warehouse where a number of Voting Machines are being prepared prior to an election. During the election proper, the voting ballot template can be used repeatedly, for hundreds of times in a single day, without being altered, damaged or consumed in any way. It merely serves as a graphical display of electoral choices and their corresponding "buttons" that will signal specific choices to the Voting Station when pressed, whose layout will be clearly visible to voters through the transparent protective layer in the lid of the Electronic Pad Device.

The voting ballot template is a pre-printed paper sheet having a specific electoral configuration for a specific Electronic Voting Pad, in a chain of Electronic Pad Device units, connected to a specific voting machine, in a given polling center in a certain location, preconfigured in precise concordance with the electoral database subset in the Voting Machine or Voting Station to which it is connected, along with other units in a chain of Electronic Pad Device units. To address the needs of sight-impaired voters, instead of a printed paper sheet, ballot templates could consist of plastic sheets imprinted in Braille, along with suitable lines connecting Braille texts with their corresponding pressure points, all of these printed in relief. In such case the lid's transparent plastic sheet would be removed as the touch surface would be the ballot template itself.

In order for the Electronic Pad Device to perform flawlessly, the design of the voting ballot template must conform strictly to the geometry and measurements of the Electronic Pad Device. This means that its design must fit precisely, matching the placement of said "buttons" which have fixed locations as determined by the geometry of the membranes and the spacer layer. This represents no issue at all when it comes to preparing and printing such templates, as the size of said "buttons" and their recommended spacing are well within the usual high accuracies and minute tolerances commonly attained in the graphics industry of today.

To ensure a precise alignment of the voting ballot template, each sheet has a number of peripheral perforations (six holes will suffice) that allow accommodating six corresponding stubs molded in the Electronic Pad Device body. When the voting ballot template has been inserted and all stubs have slid in said perforations, the Electronic Pad Device unit's lid may be closed and secured by turning its four screws. As an additional security measure, the lid's visible screw heads may be sealed using security decals, and also a security tape may be used to ensure that the Electronic Pad Device is not tampered with after its final preparation.

Figure 6:
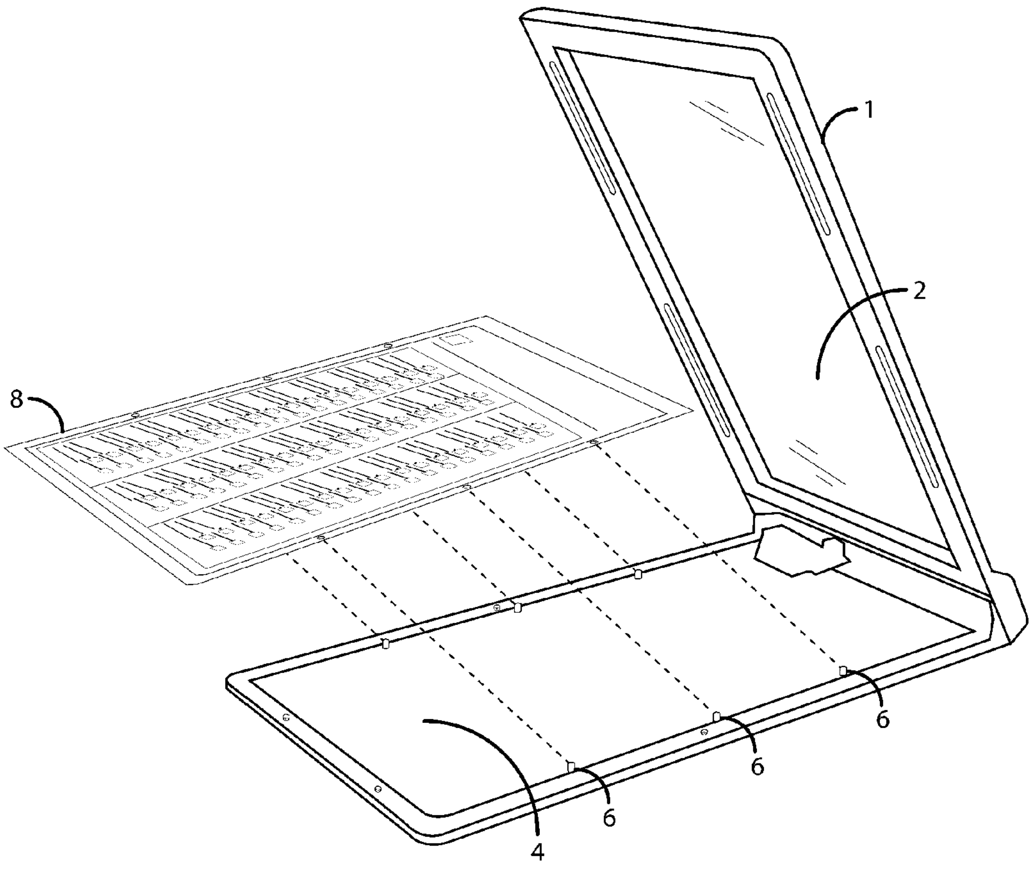
FIG. 6 shows an Electronic Pad Device being prepared for an election.

FIG. 6 shows an Electronic Pad Device being prepared for an election. All that is required, following a simple set of instructions prepared beforehand, is that the voting ballot template specific to a specific Electronic Pad Device unit be inserted under the lid and then the unit be closed and sealed. When preparing a chain of Electronic Voting Pad units for a given Voting Station, the order of voting ballot templates must strictly follow the same order the Electronic Voting Pad units are connected in the chain. Preprinted digits or codes in the template may be used to assist operators to perform this simple task with no mistakes.

Figure 7:
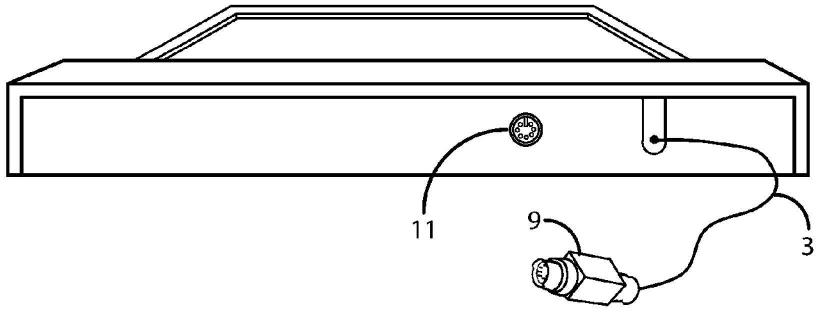
FIG. 7 shows the hind side of the Electronic Pad Device unit.

FIG. 7 shows the hind side of the Electronic Pad Device unit, depicting a standard PS2 cable 3 and connector 9. Also shown is a PS2 female port 11 that is intended only for connecting another device of the same kind, namely, another identical Electronic Voting Pad Device.

The PS2 cable connects the unit either to the host processor of the Voting Machine, as in the case of a first or single Electronic Voting Pad, or to the female PS2 port of another Electronic Pad Device unit, the one that precedes the present unit in a chain. Both the controller circuit's firmware logic and the Voting System resident in the host support this chain arrangement, whereby up to ten Electronic Pad Device units may be chained together, if the need arises, without requiring any external power supply. However in the unlikely event that more units must be chained together, an unlimited number may be connected, using additional power supply modules for the eleventh unit and those beyond. Each Electronic Pad Device unit that is added to a chain contributes an additional three hundred voting "buttons", enabling a virtually unlimited capability of electoral options to be configured in an election's administrative preparations.

FIG. 8 shows an example of an arrangement comprised of four chained Electronic Pad Device units belonging to a specific voting station. Each unit has a different voting ballot template, complementing one another, and the four comprise a complete electoral roster for a given Voting Station in any given polling place in any given precinct or jurisdiction for a specific election. Each one of the choices shown in the pre-printed ballot templates must precisely match the voting options resident in the Voting Station's corresponding voting database subset, and this requirement must be a mandatory part of the diagnostic routines that must be performed in each voting station prior to an election.

Operation of the Generic Means of the Invention

The above-mentioned functions made available to end users, that is, the voters, are only a fraction of a plurality of functions that are attained solely through the concourse of accompanying system software, henceforth referred to as the Voting System, a part of which must reside in a host processor connected to or integrated with the Voting Devices.

The present invention applies equally to an Electronic Voting Pad, which is the preferred embodiment to be described in detail later, to a Push-Button device, and to a Touch Screen.

It is taken for granted, however, that the main input/output device used for communicating with the Voting System and for carrying out interactively both the administrative and the voting operations inherent to such Voting System, is a touch screen device, an integral part of and inseparable from the Voting Station, while the Electronic Pad Device and the Push-Button devices, while either one of them necessary for most elections, are in truth optional, depending on the particular configuration and/or the peculiarities of the electoral event at stake: in the example given above, of simple polls where the voting options are either "yes" or "no", as in the case of referenda or state legislation proposals, the expanded capability of either Electronic Voting Pads or Push-Button devices would not be required.

The following paragraphs describe the proposed operation of the Voting Input Devices, under tight program control of the Voting System operating in the Voting Station to which such devices belong and/or constitute a part of. Other several functions, previsions, safeguards, characteristics and features pertaining to the Voting System proper, not related to the Voting Devices that are the object of the present invention, are not discussed in this document. Similarly, detailed functions and features of the Voting Station and its local subset version of the overall Voting System, not specific or directly related to the voting device(s), are not covered.

1. At least one of the Voting Devices in operation should clearly display the complete roster of available electoral choices to the voter. The Electronic Voting Pad units fulfill this condition in all cases. The voting choices should be easily readable and the location of the buttons (either real, in a push-button device, or virtual, in a touch screen), or pressure areas in an Electronic Voting Pad, should be easily identifiable on the spot, upon the voter entering the voting booth or cubicle.

2. The Voting System must disable all inputs from any of the above-mentioned physical means available, until the very moment a voter arrives afresh and gets ready for the voting act; whereupon the Voting System enables the corresponding devices. Consequently, upon completing the act of casting a vote, prior to leaving the voting booth or cubicle, the Voting System must again disable all input until the next voter is granted access.

3. When the voter makes a choice and takes its corresponding mechanical action, namely, he/she presses a push button, or a "virtual button", or touch area in a touch screen, valid for any one voting choice, there should be an immediate feedback, either consisting of a change in shading or colors in the selected area in the screen, displaying the same option being selected. Similarly, when an Electronic Pad Device is used, upon pressing one of the valid voting options in the ballot image visible in the Electronic Voting Pad, the accompanying touch screen should immediately display the same selected choice. In the same fashion, if a touch-button device is used, the touch screen should behave in the same fashion as above. As a means to reinforce the feedback that the voter receives, the Voting System may activate specific lights and sound signals as a result of any actions performed.

4. During the voting act, the voter must be given the opportunity to change his/her mind and make all changes desired to any one of the electoral choices previously made, until he/she is fully satisfied with the final assortment of choices displayed on-screen. Only at that stage the vote may be actually cast. Even at that final stage, the voter should be issued a final warning and given a final opportunity to change his/her mind or confirm that the choices are as intended. Upon pressing a virtual "Vote" button and possibly a final "Yes" answer confirming all choices made, the Voting System should accept the vote and proceed with subsequent actions.

5. A particular function of the Voting System, in line with many recent decisions and current regulations being adopted everywhere regarding electronic voting, is the on-the-spot printing of a numbered receipt, or paper trail, furnishing a permanent paper record that displays the choices made, showing the voter a definitive record of his/her vote. The voter might be allowed or expected to compare the printed choices to shoes still being displayed in the Voting Station's Touch Screen. Besides serving as a confirmation that the voter's choices were accepted as intended, the receipt serves as physical proof of each vote; even might serve as a back-up copy of the electronic vote, and as such should be deposited in a ballot box for later audits or recounts, if required.

6. The security and reliability-oriented functions supported by the local Voting System residing in the host, together with the firmware in the data entry devices belonging to a Voting Station, must include the detection of any alteration in their configuration that may occur at any moment during actual voting, such as device malfunction, disconnection, or replacement of any one of the units comprising said data entry configuration of devices, and the ensuing actions and/or procedures oriented toward solving or addressing such anomalies. Insofar as said configuration may be pre-established and stored in the Voting Station at the warehouse preparation stage, under control of the Election Administration section of the associated voting system, any alteration made to the exact order and placement of specific units attached to any one Voting Station should be readily detected. The necessary provisions for this and other security-oriented functions have been included In the following detailed description of the preferred embodiment, reference is made to the accompanying drawings which form a part hereof, and in which is shown by way of illustration specific preferred embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit or scope of the invention. The following detailed description is, therefore, not to be taken in a limiting sense, and the scope of the present invention is defined only by the appended claims.

Principles of Operation and Functional Characteristics of the Preferred Embodiment The Electronic Pad Device that constitutes the preferred embodiment of the present invention has the following principles of operation and assortment of functional characteristics. A number of functional characteristics have been designed with security and reliability previsions in mind; and as such these are highly dependant on detailed pre-specified requirements implemented in the associated Voting System software, in close synchronization with the Electronic Voting Pad's firmware that resides in its controller circuit. The principles of operation and functional characteristics of the preferred embodiment may be summarized as follows:

The Electronic Pad Device features a matrix arrangement that yields 300 contact points or "keys", each of which can be assigned a specific meaning by the Voting System software that operates in the host processor to which it is connected;

Its 300 keys are arranged in four columns and seventy-five rows, where the numbering of keys starts from the upper left key and increases along the same column until the $75^{th}$ key, then proceeds from the upper key of the second column, thus being numbered from 76 up to 150, and so forth until the last key of the fourth column, the $300^{th}$ key (see FIG. 4);

It is designed to support the connection of several units in a chain, whereby a first Electronic Pad Device is connected to the Voting Machine or processor within the Voting Station, then a second Electronic Pad Device is connected to the first one, subsequently a third Electronic Pad Device is connected to the second one, and so forth, until sufficient contact points or "keys" are made available as determined by the electoral options in force in any given location or poll center where said voting machine or voting station is deployed, and also by the design of the ballot templates that will be used, up to a maximum of ten (10) chain-connected Electronic Voting Pads without needing an external power supply; or more still, if suitable power supplies is used for those following the tenth Electronic Pad Device in the chain.

It communicates with the host processor residing in the connected voting machine or voting station, using standard bi-directional PS2 protocol;

It contains a PS2 connector and a female PS2 port; the PS2 connector being fully compliant and compatible with the PS2 standard protocol, while the female port is compatible only with another device of the same kind, namely, another identical Electronic Voting Pad;

Out of its 300 keys, only those that are preconfigured by programming in the corresponding voting system resident in the Voting Machine that the Electronic Pad Device unit is attached to will have any meaning or effect, due to the fact that the accompanying software will, depending on the particular electoral design configuration for this voting machine or voting station, ignore those keys that have not been pre-assigned;

The controller circuit belonging to each Electronic Pad Device constantly monitors the membrane circuits leading to the 300 keyswitches, or individual "keys", or "buttons", meaning any one of the three hundred available touch-sensitive areas in the Electronic Voting Pad. Each "key" or "button" has a unique set of associated codes, also known as scan codes, which uniquely identify it to the host.

When any single "key" is pressed, such "keystroke" will be detected by the Electronic Voting Pad's controller circuit, operating under control of its resident firmware, and it will send a single sequence of characters, or scan codes, to the host processor.

No repetitions are sent. This means that if a single key is pressed and remains pressed, a scan code string is sent only once when pressure is first exerted, and none when released.

In the event that two or more keys are pressed at the same time, the Electronic Pad Device will send a scan code corresponding to the first key detected, then will wait for a 400 ms delay, after which it will send the scan code for the second key; and so on until the cycle is complete. If the same keys remain pressed, the same sequence of scan codes will be resent in the same order, with the same delays, until they are released. This is useful for detecting unintentional pressure being applied to the Electronic Pad Device (for example, a solid object lying or pressing upon its surface), or for detecting Electronic Pad Device malfunction.

The firmware has provisions for storing a six-digit serial number that may be useful to uniquely identify any one Electronic Pad Device unit connected in a chain, as seen from the host processor or Voting Machine. In other words, using this six-digit serial number, the accompanying software in the host (the "Voting Station") is able to identify from which Electronic Pad Device unit in a chain comes any given keystroke or character sequence received.

The scan code string that is transmitted to the Voting Machine or the processor within the Voting Station for each key pressed ("keystroke"), is comprised of a plus sign ('+'), followed by a single digit that represents the relative address of the Electronic Pad Device unit being actuated within the sequence of interconnected Electronic Voting Pads, followed by a minus ('–') sign, followed by a 6-digit serial number of this specific Electronic Pad Device unit, followed by another minus sign ('–'), followed by a 3 digit-key number (from 001 to 300), and terminated by an asterisk symbol ('*'). For example, if the seventh consecutive key of a second Electronic Pad Device unit having a serial number of '100475' in a chain is pressed, the host processor will receive the following string: +2-100475-007*. This will notify unequivocally to the Voting System software resident in the Voting Machine's (or Voting Station's) processor that a specific keystroke in a specific Electronic Pad Device unit in a chain was made.

As long as the host processor-to-voting-pad communication is bidirectional, the host is able to send commands to any one specific Electronic Pad Device (or to all units) in a chain of interconnected units, thus implementing several detection and diagnostic functions. In turn, the Controller Circuit logic in the Electronic Pad Device unit involved must execute the received command. In this way, through combining commands, firmware features and programming algorithms, the host program may detect several exception conditions that might occur during a given voting process.

A non-exhaustive list of commands enabled in the firmware logic (see FIG. 10) is the following: Enable Electronic Voting Pad, Disable Electronic Voting Pad, Last Ping (ask which Electronic Pad Device is last in chain), Serial Ping (ask if an Electronic Pad Device having a specific serial number is alive), Position Ping (ask for the Serial Number of a $n^{th}$ Electronic Pad Device in a chain), Ping All, Acquire Firmware Version (of a specific Electronic Voting Pad), Acquire All Firmware Versions (of all Electronic Voting Pads in chain); Change Serial command (can be used to change any one of the Electronic Pad Device unit's serial number); Firmware Upgrade command (allows upgrading an Electronic Voting Pad's controller circuit firmware).

By means of algorithms interacting between the Voting System software resident in the Voting Machine's (or Voting Station's) processor and the Controller Circuit firmware in the Electronic Pad Device units in a connected chain, it is feasible to implement detection of several types of events that might occur during the course of a given election, such as: detection of a "device disconnection" event; detection of mid-session removal of an Electronic Pad Device unit; detection of mid-session addition of an Electronic Pad Device unit; detection of a mid-session replacement of an Electronic Pad Device unit; detection of a mid-session malfunction of an Electronic Pad Device unit.

The Controller Circuit firmware (see logic diagram in FIG. 9) in the Electronic Pad Device implements the ability to retry commands, as the PS2 port in the host Voting Machine's (or Voting Station's) processor is susceptible to collisions. This means that the host and an Electronic Pad Device can attempt to communicate transmitting at the same time, thus risking corruption of the data being transmitted; and If the Controller Circuit firmware in an Electronic Pad Device detects a collision, it will try to re-send the lost data until it succeeds. This must be done in all the Electronic Pad Device units of the chain for scan codes and commands.

Basic Commands Supported by the Electronic Voting Pad Device

A fairly rich and complete API (Application Program Interface) may readily be built in the Voting Machine to which a chain of Electronic Voting Pads are connected, using the above-mentioned commands that can be issued to the firmware in any one of the Electronic Pad Device units in a chain. A list of basic commands and their corresponding functions follows.

NOTE: In the case of host-issued commands requesting information, all responses sent back to the host processor include Position Number (in the chain of units) and Serial Number of each Electronic Voting Pad issuing a response.

Enable Electronic Voting Pad. Activates a Voting Pad unit, enabling the scanning of all available options (keypad positions) at any time.

Disable Electronic Voting Pad. Immediately deactivates a Voting Pad unit, stopping all scanning or data input. This is useful to prevent any data from being entered when the voting system is not ready, or when no data input is supposed to take place.

Last Ping (ask which Electronic Pad Device is last in chain). Only the last Voting Pad unit responds (Position Number and Serial Number). This command is useful to find out and verify, albeit in an indirect fashion, the actual number of Voting Pad units connected in the chain.

Serial Ping (ask if an Electronic Pad Device having a specific serial number is alive) Useful for ascertaining if a specific Voting Pad unit is connected and functional.

Position Ping (ask for the Serial Number of an $n^{th}$ Electronic Pad Device in a chain). Obtains the serial number of a Voting Pad unit located in a specific position in a chain of units. This command is useful as an alternative way for ascertaining whether a specific Voting Pad unit is connected and operational.

Ping All—obtains all serial numbers and relative positions of each of the Electronic Pad units in a chain.

Acquire Firmware Version (of a specific Electronic Voting Pad). Acquires the firmware version number of a specific Electronic Pad unit having a specific relative position in a chain. Useful for diagnostic purposes, for example, to determine whether certain new functionalities are available or not.

Acquire All Firmware Versions. Acquires the firmware version numbers for all Electronic Voting Pad units connected in a chain. Useful for diagnostic purposes.

Change Serial. (Can be used to change any one of the Electronic Pad Device unit's serial number); stores a new serial number in the firmware of the selected Electronic Voting Pad unit. This enables assignment of initial serial numbers at warehouse preparation time.

Firmware Upgrade (allows upgrading an Electronic Voting Pad's controller circuit firmware). For a specific Electronic Voting Pad unit, this command initiates the firmware mode whereby its update is allowed. Such procedure is initiated and performed from the host processor. Useful for adding new functionalities and new commands, or for enhancing existing ones.

Although a specific embodiment has been illustrated and described herein, it will be appreciated by those skilled in the art that any arrangement which is calculated to achieve the same purpose may be substituted for the specific embodiment shown. This application is intended to cover any adaptations or variations of the present invention. Therefore, it is manifestly intended that this invention be limited only by the following claims and equivalents thereof.

What is claimed is:

1. An electronic data entry device for use by citizens during an election so as to facilitate the actual act of voting, comprising: having electoral options displayed, where choices made by a voter from such options will be detected in order to cast a vote; designed to either connect directly to a voting machine, or to connect to another identical device which precedes said data entry device in a group, the group comprised of a plurality of identical devices connected to said voting machine in a daisy chain fashion; each data entry device connected in said daisy chain having a unique set of electoral options displayed; and having the choices made by a voter, from a set at displayed electoral options, detected and recognized as electric impulses when any one of the pressure-sensitive fields of any one of said devices in a chain is pressed by said voter in order to cast a vote.

2. The electronic data entry device of claim 1, comprising a plastic housing having a base, a lid with a protective transparent cover, a back panel, a plurality of membranes, a spacer layer, a plurality of touch-sensitive fields, a connection cable and sockets, and an electronic controller circuit designed to perform a plurality of validation, data entry, and communications control functions.

3. The electronic data entry device of claim 2, designed to accommodate a pre-printed paper sheet or overlay which is inserted into said housing as part of the election management procedures prior to an election, where said sheet is a ballot, where said ballot is made clearly visible to the voter through said transparent cover during the act of voting; said ballot dearly identifying the available electoral options, whose locations correspond in a one-to-one basis to an array of touch-sensitive or pressure-sensitive fields determined by the geometry of said membranes, and laid out in accordance to the predefined set of electoral options in the database subset stored in the connected voting machine, one paper sheet to a device, having a set of pre-established dimensions, on which an orderly array of electoral choices have been previously printed, providing the overall appearance of a traditional paper ballot; inasmuch as said overlay or paper ballot is inserted onto the voting device and protected by a transparent cover, so the paper ballot may remain visible and untouched for the whole time span of an election day, repeatedly viewed and utilized by voters at the moment of voting.

4. The electronic data entry device of claim 2, wherein the functions of said electronic controller circuit include: detection of one or more keystrokes that may occur upon pressing any of said touch sensitive fields; submittal of signals resulting from detection of said keystrokes to a voting machine, also called a "host processor"; execution of host-received commands; collision detection; and command retry, allowing the validation of the exact correspondence of the electoral options as displayed in specific location on the inserted paper ballot with those stored in the voting machine.

5. The electronic data entry device of claim 2, wherein said controller circuit does not store any information about the vote of any particular elector, or about the current electoral event taking place which the particular voting machine to which said device is connected is taking a part of.

6. The electronic data entry device of claim 2, where said controller circuit has a suitable firmware that supports a program logic that implements the several functions and commands of the device that allows said device to connect to and to communicate with a voting machine or host processor using a communication means.

7. The electronic data entry device of claim 2, wherein signals are generated when a voter presses any of said touch-sensitive fields, and transmitted to a host processor to which said device is connected; where said specific signals sent by said device to the host processor are recognized by the latter as valid voting options that have been selected by the voter; and where said device is configured for a specific polling place, to be connected to and to interact with a specific voting machine in a specific election process.

8. The electronic data entry device of claim 2, wherein said functions include the ability to perform diagnostics, verifying the proper order of connection, and ascertain the exact correspondence of active voting options with the enabled pressure-sensitive fields; where said diagnostics should be performed as part of the voting station preparation stages prior to an election, as said device does not have the ability nor provides support for the connected voting machine to automatically read the particular ballot overlay in order to verify that the proper ballot is being used; therefore said diagnostics ensure that said ballot options as displayed to the voter are identical to those in the corresponding ballot image as previously recorded electronically in the voting machine.

9. The electronic data entry device of claim 2, when the number of voting options or candidates in effect for a given contest exceeds the space and capability of up to three hundred different choices for said single device, then a plurality of identical said devices can be daisy-chain connected to their corresponding voting machine, thus overcoming in a convenient way the difficulty of accommodating a number of available choices in force which is sufficient, a capability that renders said electronic data entry device useful for a vast majority of electoral contests.

10. The electronic data entry device of claim 2, where said device will detect any disconnection of devices in a chain; and likewise will detect any addition of a device in a chain.

11. The electronic data entry device of claim 2, where said device will detect abnormal events and take the proper action, by means of sending the appropriate messages to the voting machine to which said device is connected.

12. The method designed to allow for data entry of electoral choices made by citizens during an election comprising the steps of: enabling the connection of a electronic data entry device; said device designed to either connect directly to a voting machine, or to connect to another identical device which precedes said data entry device in a group, the group comprised of a plurality of identical devices connected to said voting machine in a daisy chain fashion; where each data entry device connected in said daisy chain has a unique set of electoral options displayed; and having the choices made by a voter, from a set of displayed electoral options, detected and recognized as electric impulses when any one of the pressure-sensitive fields of any one of said devices in a chain is pressed by said voter in order to cast a vote.

13. The method as in claim 12, further comprising the steps of generating and transmitting signals corresponding to said electric impulses, or keystrokes, to a connected voting machine or host processor.

14. The method as in claim 12, further comprising the steps of interpreting received signals as keystrokes corresponding to voting choices, whose matching information is in turn contained in a database subset resident in the voting machine or host processor to which said electronic voting device is connected; said data base subset having been prepared and stored by the suitable election management subsystem in a stage prior to an election.

15. The method as in claim 12, further comprising the steps of having the received signals interpreted as keystrokes corresponding to voting choices and validating such choices against the information contained in a corresponding database subset resident in the voting machine having said host processor, and upon finding such choices as valid, accepting storing them as the whole or as part of the vote being cast, and henceforth prompting the voter to continue with the next step in the voting procedure.

16. The method in claim 12 further comprising supporting commands issued by said host processor to a specific connected electronic voting device, which in turn executes such commands.

17. The method in claim 12 further comprising a plurality of functions implemented in the firmware code resident in the controller circuit of each electronic voting device.

18. The method in claim 12 further comprising functions that lend themselves, in conjunction with the voting system software in the voting machine's processor, toward implementing measures aimed at enhancing the integrity and security of the associated voting system in said voting machine.

19. The method in claim 12 further comprising said security functions including the detection, during the course of an active voting session, of a disconnection of any device in a chain the detection of any addition of a device in a chain; and detection of abnormal events such as device malfunction; and having the capability of taking a suitable course of action for each of such detected events.

20. The method in claim 12 further comprising additional functions, including one or more of the following: enabling or disabling a specific device in a chain; assigning and storing initial serial numbers onto each of the devices in a chain; verifying all serial numbers and relative positions of each of the devices in a chain; determining the number of connected devices in a chain; obtaining the serial number of a device in a specific position in a chain; obtaining the firmware version of one or all devices in a chain; and upgrading of the firmware code of one or all devices in a chain to a higher version of said firmware.

* * * * *